Oct. 10, 1933.  W. O. VOPATA  1,929,616
DOUBLE COMPARTMENT AMPULE
Filed April 29, 1932
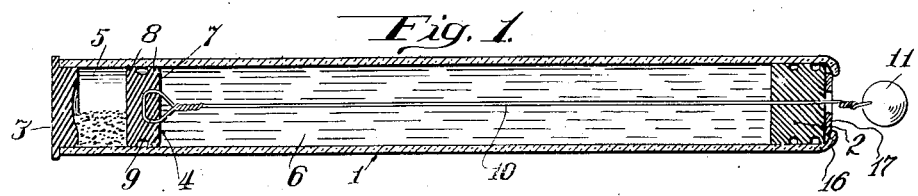
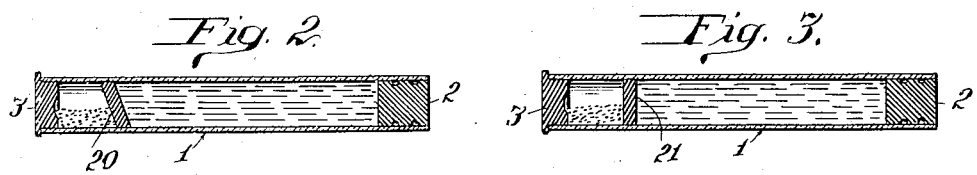
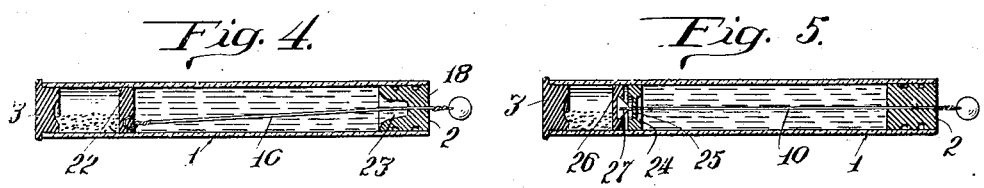
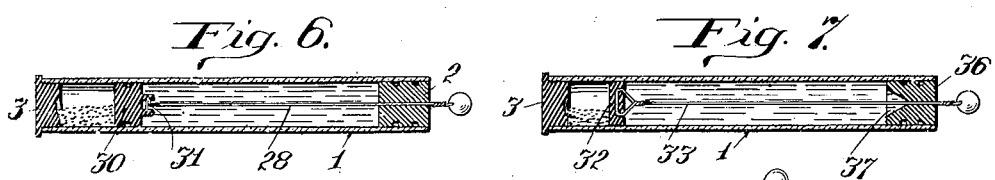
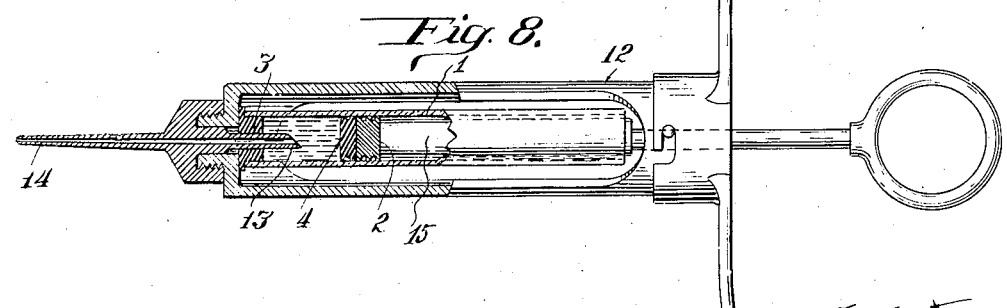
Inventor
William O. Vopata
By B. Singley
Attorney Patented Oct. 10, 1933

1,929,616

UNITED STATES PATENT OFFICE 1,929,616

DOUBLE COMPARTMENT AMPULE

William O. Vopata, Oak Park, Ill.

Application April 29, 1932. Serial No. 608,260

7 Claims. (Cl. 128—218)

This invention relates to a method of preparing solutions of inherently unstable character for immediate use, and it also relates to a container by means of which this process can be carried out.

It is an object of the invention to provide a method of separately storing within a single container several ingredients which are to be brought into contact with each other to produce the desired solution or mixture, and of eliminating the means by which these ingredients are normally maintained, in separate chambers or compartments of the container.

It is also an object of the invention to provide a container with a plurality of chambers or compartments and separating means for shutting each compartment off from the adjacent one, so as to prevent the passage of fluid or solid bodies from any compartment to another, the separating means being adapted to be rendered ineffective, whereby the ingredients may be mixed or one dissolved in the other, and may then, in this mixed or dissolved condition, be discharged from the container.

It is also an object of the invention to provide a cartridge or container in which a separator creating two compartments therein may be functionally eliminated, either through moving said separator within the cartridge and at the same time deforming it so that liquid of one compartment may flow into another compartment, or by rendering said separator permeable to the liquid, to permit the liquid to react on the ingredients stored in another compartment.

It is, furthermore, an object of the invention to provide a diaphragm within a cartridge or container which normally presents a fluid tight closure of both compartments between which it is located, but which will establish communication between the compartments when moved from the place in which it has normally been positioned. This movement may be effected by sliding said diaphragm in the cartridge or container towards one end, or tilting it to permit the liquid in one compartment to flow into the other, or in some other way.

It is also an object of the invention to provide in a cartridge closed at both ends a yieldable flexible diaphragm adapted to be deformed when placed under a mechanical strain, as by moving the same while in strong frictional contact with the walls of the container, to permit the liquid to flow past the edges of the diaphragm from one compartment to the adjacent one and effect the solution of or the intermixture with the ingredient stored in the adjacent compartment.

It is an important object of the invention to provide a cartridge or container which lends itself for insertion into a syringe for surgical use.

Certain fluids, and particularly fluids for local anæsthesia, consist of solutions which have to be prepared directly before their use owing to their inherent lack of stability. In dental surgery within recent times, a local anæsthetic by the name of "Borocaine" is preferred owing to the instantaneous effect and lack of detrimental after-effects. This preparation, however, has the disadvantage of being unstable, and it must, therefore, be furnished to dental surgeons by manufacturers in solid form, and cannot be furnished in solution. This preparation and also other anæsthetics furnished manufacturers in form of solutions, not only cease to be useful, but actually become harmful when left standing,—a condition which shows itself by a discoloration of the liquid.

The present invention contemplates the provision of a cartridge containing the undissolved material in a form in which it retains its stability and usefulness, and also containing a chamber for the solvent, the two chambers being placed into communication with each other just prior to the use of the anæsthetic, and the cartridge being then insertable immediately into an ordinary dental syringe from which the solution just then prepared and having its highest degree of efficiency may be injected into the part to be anæsthetized.

With these and numerous other objects in view, a plurality of embodiments of these cartridges are illustrated in the accompanying drawing.

In the drawing:

Fig. 1 shows in longitudinal section a cartridge of this character magnified;

Figs. 2 to 7 illustrate on a smaller scale modified embodiments of this cartridge or container, and Fig. 8 shows in elevation a cartridge of this character inserted into a syringe for immediate use.

The container or cartridge 1 preferably is constructed as a cylindrical glass tube of predetermined length and adapted to be closed at both ends by some closure material of resilient character, as for instance live rubber plugs 2 and 3. This material has the advantage that upon piercing it and then withdrawing the piercing tool, the small openings produced will automatically close again so that the closure plugs can be reused if desired. In the embodiments illustrated this cartridge is divided in two chambers only, for which purpose a separator 4 is frictionally positioned within the tube 1 at a predetermined point so as to divide the interior into two compartments 5 and 6. One of said chambers may serve for receiving the solvent, as for instance water, and it is obvious that the volumetric contents of this chamber may be selected to receive a predetermined amount only of the solvent between the closure 2 and the separator 4. The other compartment 6 may be of much smaller volumetric content and may receive in solid or liquid form the substance or substances which are to be thoroughly mixed with the solvent in the other chamber. These ingredients may be in solid form, as for instance in the form of a tablet or in the form of a powder facilitating the solution, as compared with the solid, or it may even be in semi-liquid, pasty, or liquid form, in which last named case the two liquids, upon being brought into contact with each other, will enter in the desired reaction—although it may not be proper to speak in that case of a solution of one ingredient in a solvent.

The separator 4 as well as the closures 2, 3 are made of neutral material which is not attacked by the ingredients nor detrimentally affects these ingredients. In the embodiment illustrated in Fig. 1, this diaphragm or separator comprises a main portion 7 and relatively thin flange portions 8, the flanges being separated from each other by a weakened cross-sectionally reduced portion of the diaphragm. For this purpose a circumferential groove 9 is shown by way of example as a means of enhancing the flexibility of this separator. A very thin wire 10 or some other tension element also made of a material which does not detrimentally affect the solvent is connected with this separator and extends through the outer closure member 2 where it advisably is provided with a small handle 11.

The cartridge 1 may have a slight bead 16 overlapping the outer end of the closure plug 2 to prevent its withdrawal when the separator 4 is pulled outward. It is also feasible to insert a metal washer 17 between the outer face of the plug 2 and the rim 16 to hold the plug 2 securely in place when the wire 10 is forcibly torn apart. This washer 17 also will equalize the pressure when the plunger plug 2 is forced back again into the tube.

It will be obvious that by exerting a pull by means of the handle 11 on the tension element 10, the separator 4 will be moved into the chamber containing the solvent, and owing to the pressure of the liquid exerted against this diaphragm, the thin flange portion 8 will be slightly deflected, thereby permitting the liquid from this compartment to flow into the other compartment containing the material to be dissolved. This solution with many ingredients takes place immediately and may be enhanced by slightly shaking the entire cartridge. The cartridge then containing the freshly prepared solution is made ready for insertion into the syringes by snipping off the wire 10 at that point at which it projects from the closure 2. In this condition the cartridge is inserted into the syringe 12, whereby the closure 3 at the opposite end is pierced by the inner point 13 of the hypodermic needle 14. Owing to the absence of pressure against the other end of the cartridge, the liquid, however, will not be discharged immediately from the needle. When the physician, however, applies pressure in a known way to the plunger 15 of the syringe, this plunger forces the closure 2 into the interior of the cartridge 1 and thereby ejects in a uniform even thin stream, or drop by drop, the contents of the cartridge in the form of a freshly prepared solution or mixture thru said hypodermic needle.

In the embodiment of Fig. 2, the separator 20 is positioned under an angle differing slightly from a right angle to the axis of the container 1 while still maintaining, owing to its resiliency, a complete separation of the two chambers from each other. In this instance an attachment of a wire to the separator becomes unnecessary, and the operation of severing this wire from the separator after the latter had been moved in direction towards the closure 2 is also dispensed with. With an embodiment of this character the separator 20 remains substantially in position until the cartridge has been inserted into the syringe and the closure 3 has been pierced by the inner point of the hypodermic needle. When by means of the plunger 15 of the hypodermic syringe, the closure 2 is forced into the cartridge, the pressure exerted on the liquid will cause the separator 16 to tilt to nearly axial position so as to establish communication between the two chambers, and to effect the immediate solution of the ingredient of the smaller chamber, and the almost simultaneous ejection of this solution through the needle.

In the embodiment illustrated in Fig. 3, the separator 21 may consist of a diaphragm made of some neutral material, inert with reference to the contents of both chambers, but adapted to be fused upon the application of heat externally to that part of the cartridge 1 in which the diaphragm 21 is located. Again upon a fusion of the marginal portion only of the diaphragm, communication between the two chambers is established, and the solution is effected immediately. Here also the movement of the plunger 15 of the syringe forcing the closure plug or plunger 2 of the cartridge 1 in direction towards the stopper 3 will cause the ejection of the freshly prepared solution through the hypodermic needle.

In the embodiment illustrated in Fig. 4, the movable closure 18 of the cartridge 1 again is provided with an opening through which a tension element or wire 10 extends, the inner end of this wire being secured to the separator 22 adjacent an edge thereof. The plunger closure 18 is provided on the inner face with a relatively deep recess 23 into which by a pull on the wire 10 the separator 22 is drawn. This embodiment has the advantage that the separator firmly retains this position during the advance movement of the plunger 2 of the cartridge, thereby dispensing with any possibility of interference of this separator 22 with the smooth ejection of the liquid from the container.

In the embodiment shown in Fig. 5, the separator comprises two parts which are relatively movable to each other, but which in their assembly are adapted to keep the two chambers out of communication. The diaphragm comprises an annular body 24 of relatively heavy cross-section, the central opening of which is covered by a thin membrane 25. Another part 26 again is attached to a wire 10 which is passed through the membrane 25 and also through the closure plunger 2 at the end of the cartridge 1. The wire 10 is secured at its inner end to the part 26 by means of a carrier 27 in the form of a piercing tool which may be made of metal or glass, so that upon a pull being exerted on the tension element 10, the point of the piercing tool 27 is forced thru the rubber membrane 25, and thereafter upon continuing this pull the communication with the two chambers again is established when the separator 24 and part 26 together are moved against the closure plunger 2 of the cartridge. Here again the wire 10 must be snipped off adjacent the outer face of the plunger 2 before the cartridge now containing the freshly prepared solution is inserted into the syringe and upon forcing the closure plunger 2 against the other end the liquid will again be discharged through the hypodermic needle.

Fig. 6 illustrates an embodiment in which the tension element 28 is removably secured to the diaphragm 30 by an attachment device 31 in the form of a short transverse member. Here also the communication between the two compartments is established upon pulling the separator 30 in direction towards the closure plug 2. After the separator in this manner has been shifted from its sealing position, the tension element can be withdrawn by a half twist of the handle 11 through a suitable slot on the diaphragm, similar to the action of a bayonet joint and the ejection of the freshly prepared solution through the hypodermic syringe again can take place, as described with reference to the other embodiments.

In the embodiment illustrated in Fig. 7, the tension element 33 is attached to the separator 32 in a manner to produce not only a movement in direction towards the plunger closure 36 of the cartridge 1, but also to bring about simultaneously a marginal deflection of the separator 32, thereby reducing the diameter of the same and effecting a very rapid passage of the liquid from the larger chamber into the smaller one to bring about the solution of the ingredient stored therein. For this purpose branches extend from the tension element 33 towards the rim of the separator 32 where they are secured, and the closure plug 36 may be provided with a recess 37 to receive these branches after the separator again has been longitudinally displaced in direction towards the other closure. Owing to the attachment of the tension element by means of these branches 34, 35, to the separator 32, the latter will be flexed when a pull is exerted on the tension element to facilitate its longitudinal shifting within the cartridge.

In all of the embodiments, the method of preparing an inherently unstable solution for immediate use is carried out by storing the ingredients, which are to go into the solution, in separate compartments of a single container and establishing communication between these compartments and then discharging the freshly prepared solution from the container. It is obvious that the term "solution", as used herein, may also be applied to mixtures of a liquid and solid or two liquids where it is desired to make use of this mixture immediately after the ingredients have been brought thoroughly into contact with each other.

I claim:

1. A container of the character described, comprising a tubular cartridge hermetically sealing closure plugs at both ends of the cartridge, a separator made of yieldable material in the interior of the cartridge and frictionally held against the interior wall surface of the cartridge at a predetermined point and adapted to seal the cartridge spaces at both sides of said separator from each other, and tension means extending through one of said closure plugs for moving said separator from the predetermined point and for deforming it, whereby communication between said originally separated spaces in the container is established.

2. A container of the character described, comprising a tubular cartridge having closure plugs at both ends, a separator of flexible neutral material frictionally held at a predetermined point in the interior of the cartridge, said separator being provided with cross-sectionally reduced portions, and means extending through one of the closure plugs for removing said separator from said predetermined point in the interior of the cartridge and for deforming said separator adjacent said cross-sectionally reduced portion thereof.

3. A container of the character described, comprising a glass cartridge, closure plugs of live rubber of which one closure plug is frictionally retained in position and adapted to be advanced through the cartridge, a separator of flexible neutral material frictionally maintained at a predetermined point in the interior of the cartridge and adapted to seal the space on one side of said separator in the interior of the cartridge hermetically against the space on the other side thereof, and means extending through one of said closure plugs for shifting and simultaneously flexing said separator in direction towards said last named closure plug, whereby upon subsequent movement of said closure plug in a predetermined direction, said closure plug and said separator are simultaneously moved through the cartridge in said direction.

4. In a container of the character described, the combination of a tubular cartridge having closure plugs at both ends, one of said closure plugs being adapted to be pierced by a needle and the other closure plug being adapted for inward sliding movement in the cartridge, a separator of flexible inert material normally frictionally retained in the interior of the cartridge at a point intermediate its ends, said separator being provided with a circumferential groove and a flexible flange adjacent thereto and engaging the inner wall of the cartridge, a wire attached to the separator and extending through the slidable closure plug, and a handle at the outer end of said wire, whereby said separator may be pulled in direction towards said slidable closure plug without requiring any removal of said plug.

5. In a container of the character described, the combination of a cartridge having closure plugs of rubber at both ends, a separator of rubber intermediate its ends and frictionally positioned within the cartridge to hermetically seal the space on either side thereof against the space on the other, and a tension element secured to the separator and hermetically passed through one closure plug for flexing and withdrawing the separator in direction towards said plug.

6. In a container of the character described, the combination of a cartridge having closure plugs at both ends, a separator intermediate its ends and frictionally positioned within the cartridge to hermetically seal the space on either side thereof against the space on the other, a tension element secured to the separator and passed through one closure plug, and a closure plug retaining means through which said tension element is passed.

7. In a container of the character described, the combination of a cartridge having closure plugs at both ends, a separator of flexible material frictionally positioned within the cartridge to hermetically seal the space on either side thereof against the space on the other, a tension element secured to the separator and passed through the closure plug, and a pressure equalizing means overlying said closure plug and held in position by a portion of the cartridge.

WILLIAM O. VOPATA.